2,827,487

PREPARATION OF 1,5-NAPHTHALENE DISULFONYL CHLORIDE

Ralph Marotta, Malden, and Robert D. Swisher, Winchester, Mass., assignors to Monsanto Chemical Company, St. Louis, Mo., a corporation of Delaware No Drawing. Application June 30, 1953
Serial No. 365,236

3 Claims. (Cl. 260—543)

The present invention relates to the preparation of naphthalene 1,5-disulfonyl chloride. This compound is a reactive chemical useful as an intermediate in the preparation of several classes of compounds, such as sulfonamides, phenolic esters, azides and hydrazides.

It is a primary object of the invention to provide improved methods for preparing naphthalene 1,5-disulfonyl chloride resulting in considerably higher yields than previously possible.

Still further objects and advantages will appear from the following description and appended claims.

According to prior methods naphthalene is slowly added to chlorosulfonic acid to effect dichlorosulfonation according to the following equation:

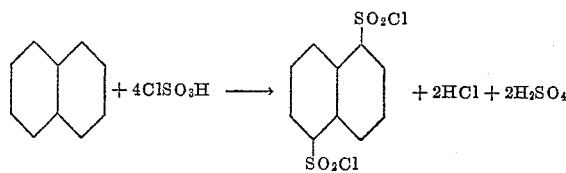

In the course of the reaction other isomers are also formed, such as naphthalene 1,6-disulfonyl chloride. Moreover, the disulfonic acid and the half-acid chloride of the di-acid are also probably formed to a minor extent.

We have found that these prior methods have several disadvantages including excessive foaming during the addition of the naphthalene to the chlorosulfonic acid. The drastic chlorosulfonation conditions employed also cause immediate darkening and some carbonization, as the napthalene contacts the excess chlorosulfonic acid. These untoward effects can be avoided by adding the chlorosulfonic acid to the naphthalene and in general following the procedures hereinafter outlined and further described in the examples. Moreover, the improved methods described herein not only avoid the troublesome conditions referred to above, but result in definitely higher yields than heretofore obtained.

The improved methods of this invention are in general carried out by gradually adding suitable proportions of chlorosulfonic acid to naphthalene, which may either be in molten condition or in solution in an inert solvent such as carbon tetrachloride or liquid sulfur dioxide. The use of a solution in liquid sulfur dioxide is preferred since the highest yields are obtained in this manner. However in some cases it may be more economical to carry out the reaction without diluents.

Between 4 and 8 mols of chlorosulfonic acid per mol of naphthalene should be used, as amounts in excess of this offer no advantage. The temperature of the reacting mass is relatively unimportant, provided it is kept below 150° C. Preferably, the temperature is maintained between —10 and 100° C., although lower temperatures may be employed.

Since the naphthalene 1,5-disulfonyl chloride prepared by these methods precipitates out as crystals, it may be readily filtered, as through glass cloth, and the water quenching usually employed in the preparation of sulfonyl chlorides may be dispensed with. However, the various advantages of this invention may also be obtained, when quenching is used. Preferably, the crystals are filtered and then washed in chlorosulfonic acid and finally in water.

A further understanding of the invention will be obtained from the following examples.

Example I

To 64 grams of a naphthalene melt maintained at 80° C. in a 1 liter 3-neck flask equipped with a glass stirrer, thermometer and a condenser, 408 grams of chlorosulfonic acid were added from a dropping funnel during a period of one hour, while continuously stirring. HCl gas was evolved in the course of the resulting exothermic reaction, the bulk of which took place during the first half hour. At the end of one-half hour the batch was cooled to 10° C. and the remainder of the chlorosulfonic acid was added during the next half hour. While warming to room temperature stirring was continued for an additional two hours, at the end of which time crystallization took place. The crystals were filtered through glass cloth and washed twice, each time with 20 cubic centimeters of chlorosulfonic acid. The resulting white crystals were then slurried in 300 cubic centimeters of ice water, filtered, washed with 800 cubic centimeters of water and finally dried at 120° C., yielding 69.6 grams of white, crystalline naphthalene 1,5-disulfonyl chloride having a melting point of 181–183° C. This represented a yield of 42.8% based on the starting naphthalene.

Example II

Four hundred and eight grams of chlorosulfonic acid were added dropwise over a period of about three quarters of an hour into 600 cubic centimeters of liquid $SO_2$ containing 64 grams of dissolved naphthalene. The mixture was continuously agitated, and the temperature was held at —8° C., the boiling point of the mixture. Two hours after the chlorosulfonic acid was introduced, the sulfur dioxide was boiled out and the large crystalline precipitate formed was filtered out through glass cloth, after which it was washed twice with 20 cubic centimeters of chlorosulfonic acid. The crystals were then slurried in 300 cubic centimeters of ice water, filtered and washed with 800 cubic centimeters of water. After drying 80.1 grams of naphthalene 1,5-disulfonyl chloride were obtained in the form of white crystals having a melting point of 178–181° C. This represented a yield of 49.3% based on the starting naphthalene.

When this same procedure was carried out except that the naphthalene was introduced into the chlorosulfonic acid dissolved in sulfur dioxide and a larger excess of chlorosulfonic acid was employed, the yield of crystals was only 39.2%.

Example III

Six hundred and twelve grams (5.25 mols) of chlorosulfonic acid were added dropwise and with stirring in the course of about 55 minutes to 96 grams (0.75 mol) of a naphthalene melt maintained at 79° C. during the first half of the reaction. During this period foaming occurred, but was easily controlled. During the second half of the reaction, the chloorsulfonic acid was added fairly rapidly at 60° C. without appreciable foaming. Stirring was continued for 1 hour longer at 60° C. and the batch became thick with crystals of naphthalene 1,5-disulfonyl chloride. After standing overnight the batch was quenched in 1800 cubic centimeters of water having a temperature below 30° C. After decanting the excess water, the precipitate was subjected to several hot water washes and finally held for 1 hour in boiling water.

The precipitate was then removed from the water in the form of a light brown, taffy-like cake, which represented a 78.2% yield of mixed sulfonyl chlorides. On recrystallizing this from benzene, crystals having a melting point of 182–184° C. were obtained representing a yield of 39.1% based on the original naphthalene.

When the same procedure as above was carried out, except that the naphthalene was added to the chlorosulfonic acid maintained at 85° C., a yield of only 57.7% of crude sulfonyl chlorides was obtained. When recrystalized from benzene, this gave impure crystals of napthalene 1,5-disulfonyl chloride having a melting point of only 171–179° C., in a yield of 29% based on the original naphthalene.

The reaction mixtures obtained in accordance with the above examples can be worked up to remove the crystals within 1 or 2 hours after all the chlorosulfonic acid has been added. However, if necessary, the reaction mixture can be allowed to stand for several days at room temperature without deleterious effect, after which the crystals may be isolated.

The crystals obtained direct from the reaction mixture according to the methods described herein are lighter in color and have less impurities than such crystals obtained by previous methods. Moreover, they may be isolated readily. It is prefered to isolate the crystals by direct filtration of the reaction mixture. However, quenching in water followed by recrystallization from benzene, may be used, if desired.

What is claimed is:

1. In the process of preparing naphthalene-1,5-disulfonyl chloride by reaction between chloro-sulfonic acid and naphthalene, the step which comprises gradually adding from 4 to 8 molecular proportions of chloro-sulfonic acid to 1 molecular proportion of naphthalene dissolved in liquid sulfur dioxide.

2. In the process of preparing naphthalene-1,5-disulfonyl chloride by reaction between chloro-sulfonic acid and naphthalene, the step which comprises gradually adding from 4 to 8 molecular proportions of chloro-sulfonic acid to 1 molecular proportion of naphthalene dissolved in liquid sulfur dioxide at a temperature below 150° C.

3. In the process for preparing naphthalene-1,5-disulfonyl chloride by reaction between chloro-sulfonic acid and naphthalene, the step which comprises gradually adding from 4 to 8 molecular proportions of chloro-sulfonic acid to 1 molecular proportion of naphthalene dissolved in liquid sulfur dioxide at a temperature between −10 and 100° C.

References Cited in the file of this patent

UNITED STATES PATENTS 2,214,379    Moser et al. _____ Sept. 10, 1940

FOREIGN PATENTS 466,441    Germany _____ Oct. 8, 1928
757,503    Germany _____ Apr. 10, 1952

OTHER REFERENCES

Corbellini: Giorn. Chim ind. Applicata, vol. 9, pp. 118–120 (1927).

Huntress et al.: 62 J. A. C. S. 511–514 (1940), pp. 512–513 particularly applicable.

Groggins: Unit Processes in Organic Synthesis, 4th ed., 1952, pp. 298 and 311.